(12) United States Patent
Chang et al.

(10) Patent No.: US 9,261,997 B2
(45) Date of Patent: Feb. 16, 2016

(54) TOUCH REGIONS IN DIAMOND CONFIGURATION

(75) Inventors: Shih Chang Chang, Cupertino, CA (US); Marduke Yousefpor, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1147 days.

(21) Appl. No.: 12/545,604

(22) Filed: Aug. 21, 2009

(65) Prior Publication Data

US 2010/0194696 A1 Aug. 5, 2010

Related U.S. Application Data

(60) Provisional application No. 61/149,270, filed on Feb. 2, 2009.

(51) Int. Cl.
*G06F 3/041* (2006.01)

(52) U.S. Cl.
CPC .................................... *G06F 3/0412* (2013.01)

(58) Field of Classification Search
None
See application file for complete search history.

(56) References Cited

U.S. PATENT DOCUMENTS

| | | | |
|---|---|---|---|
| 4,087,625 A | 5/1978 | Dym et al. | |
| 4,090,092 A | 5/1978 | Serrano | |
| 4,304,976 A | 12/1981 | Gottbreht et al. | |
| 4,475,235 A | 10/1984 | Graham | |
| 4,659,874 A | 4/1987 | Landmeier | |
| 5,194,862 A | 3/1993 | Edwards | |
| 5,317,919 A | 6/1994 | Awtrey | |

(Continued)

FOREIGN PATENT DOCUMENTS

| | | |
|---|---|---|
| CN | 1672119 A | 9/2005 |
| CN | 1711520 A | 12/2005 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Joseph Feild
*Assistant Examiner* — Henok Heyi
(74) *Attorney, Agent, or Firm* — Morrison & Foerster LLP

(57) ABSTRACT

Touch regions in a diamond configuration in a touch sensitive device are disclosed. Touch regions can include drive regions of display pixels to receive stimulation signals and sense regions of display pixels to send touch signals based on a touch or near touch. The drive regions and sense regions can be disposed diagonally adjacent to each other to form a diamond configuration. In an example diamond configuration, diagonal drive regions can be separate and unconnected from each other, while diagonal sense regions can be electrically connected to each other via their sense lines. The diagonal sense region connections can be in a forward diagonal direction, a backward diagonal direction, or a combination thereof. In an alternate example diamond configuration, diagonal drive regions can be electrically connected to each other via their drive lines, while diagonal sense regions can be electrically connected to each other via their sense lines. The diagonal drive and sense region connections can be in a forward diagonal direction, a backward diagonal direction, or combinations thereof. An exemplary touch sensitive device having a diamond configuration can be a touch screen.

25 Claims, 11 Drawing Sheets

(56) References Cited

U.S. PATENT DOCUMENTS

| | | |
|---|---|---|
| 5,459,463 A | 10/1995 | Gruaz et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 6,137,427 A | 10/2000 | Binstead |
| 6,163,313 A | 12/2000 | Aroyan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,932,898 B2 | 4/2011 | Philipp et al. |
| 8,120,371 B2 | 2/2012 | Day et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,479,122 B2 | 7/2013 | Hotelling et al. |
| 8,487,898 B2 | 7/2013 | Hotelling |
| 8,593,425 B2 | 11/2013 | Hong et al. |
| 2003/0076325 A1* | 4/2003 | Thrasher ........................ 345/443 |
| 2004/0017362 A1 | 1/2004 | Mulligan et al. |
| 2004/0090429 A1 | 5/2004 | Geaghan et al. |
| 2004/0119701 A1 | 6/2004 | Mulligan et al. |
| 2004/0239650 A1 | 12/2004 | Mackey |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0270039 A1 | 12/2005 | Mackey |
| 2005/0280639 A1 | 12/2005 | Taylor et al. |
| 2006/0026521 A1 | 2/2006 | Hotelling et al. |
| 2006/0038791 A1 | 2/2006 | Mackey |
| 2006/0097991 A1 | 5/2006 | Hotelling et al. |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0278444 A1 | 12/2006 | Binstead |
| 2007/0008299 A1 | 1/2007 | Hristov |
| 2007/0074914 A1 | 4/2007 | Geaghan et al. |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0279395 A1 | 12/2007 | Philipp |
| 2007/0283832 A1 | 12/2007 | Hotelling |
| 2008/0024456 A1 | 1/2008 | Peng |
| 2008/0062140 A1 | 3/2008 | Hotelling et al. |
| 2008/0074398 A1 | 3/2008 | Wright |
| 2008/0136787 A1 | 6/2008 | Yeh et al. |
| 2008/0158167 A1 | 7/2008 | Hotelling et al. |
| 2008/0158181 A1 | 7/2008 | Hamblin et al. |
| 2008/0264699 A1 | 10/2008 | Chang et al. |
| 2008/0277259 A1 | 11/2008 | Chang |
| 2008/0283175 A1* | 11/2008 | Hagood et al. ................. 156/145 |
| 2008/0303022 A1 | 12/2008 | Tai et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0054107 A1 | 2/2009 | Feland et al. |
| 2009/0085894 A1 | 4/2009 | Gandhi et al. |
| 2009/0091551 A1 | 4/2009 | Hotelling et al. |
| 2009/0135157 A1 | 5/2009 | Harley |
| 2009/0182189 A1 | 7/2009 | Lira |
| 2009/0184937 A1* | 7/2009 | Grivna .......................... 345/173 |
| 2009/0205879 A1 | 8/2009 | Halsey, IV et al. |
| 2009/0236151 A1 | 9/2009 | Yeh et al. |
| 2009/0242283 A1 | 10/2009 | Chiu |
| 2009/0267902 A1 | 10/2009 | Nambu et al. |
| 2009/0273577 A1* | 11/2009 | Chen et al. .................... 345/174 |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1* | 1/2010 | Hotelling et al. .............. 345/174 |
| 2010/0007616 A1* | 1/2010 | Jang ............................. 345/173 |
| 2010/0059294 A1 | 3/2010 | Elias et al. |
| 2010/0079384 A1* | 4/2010 | Grivna .......................... 345/173 |
| 2010/0110035 A1* | 5/2010 | Selker .......................... 345/174 |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0253638 A1* | 10/2010 | Yousefpor et al. ............ 345/173 |
| 2010/0328228 A1 | 12/2010 | Elias |
| 2010/0328248 A1 | 12/2010 | Mozdzyn |
| 2011/0007020 A1 | 1/2011 | Hong |
| 2011/0096016 A1 | 4/2011 | Yilmaz |
| 2011/0134050 A1 | 6/2011 | Harley |
| 2012/0026099 A1 | 2/2012 | Harley |
| 2012/0113047 A1 | 5/2012 | Hanauer |
| 2013/0120303 A1 | 5/2013 | Hong et al. |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 12/2000 |
| EP | 1 192 585 B2 | 12/2000 |
| EP | 1 573 706 A2 | 2/2004 |
| EP | 1 573 706 A3 | 2/2004 |
| EP | 1 644 918 A2 | 12/2004 |
| EP | 1 986 084 A1 | 10/2008 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 | 1/2007 |
| JP | 2008-510251 A | 4/2008 |
| TW | M344522 | 11/2008 |
| TW | M344544 | 11/2008 |
| WO | WO-01/97204 A1 | 12/2001 |
| WO | WO-2005/114369 A2 | 12/2005 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/115032 A2 | 10/2007 |
| WO | WO-2007/146785 A2 | 12/2007 |
| WO | WO-2007/146785 A3 | 12/2007 |

(56) References Cited

FOREIGN PATENT DOCUMENTS

| WO | WO-2008/007118 A2 | 1/2008 |
|---|---|---|
| WO | WO-2008/007118 A3 | 1/2008 |
| WO | WO-2008/076237 A2 | 6/2008 |
| WO | WO-2008/076237 A3 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/117882 A2 | 10/2010 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece &id . . . >, last visited Jan. 23, 2009, two pages.

Chinese Search Report completed Jun. 3, 2011, for CN Patent Application No. ZL2009201524013, with English Translation, 20 pages.

Chinese Search Report mailed Jan. 7, 2011, for CN Application No. 2009200081997, filed Apr. 24, 2009, with English Translation, 14 pages.

Chinese Search Report mailed Jan. 10, 2011, for CN Application No. 2008201338142, filed Sep. 27, 2008, with English Translation, 25 pages.

European Search Report mailed Mar. 19, 2009, for EP Application No. 08017396.6, filed Oct. 8, 2008, seven pages.

Final Office Action mailed Jun. 8, 2011, for U.S. Appl. No. 12/038,760, filed Feb. 27, 2008, 20 pages.

Final Office Action mailed Dec. 15, 2011, for U.S. Appl. No. 12/333,250, filed Dec. 11, 2008, 12 pages.

Final Office Action mailed Jan. 5, 2012, for U.S. Appl. No. 12/206,680, filed Sep. 8, 2008, 15 pages.

Final Office Action mailed Jan. 19, 2012, for U.S. Appl. No. 12/110,024, filed Apr. 25, 2008, 12 pages.

Final Office Action mailed Aug. 31, 2012, for U.S. Appl. No. 12/110,075, filed Apr. 25, 2008, 15 pages.

Final Office Action mailed Dec. 24, 2012, for U.S. Appl. No. 12/110,024, filed Apr. 25, 2008, 21 pages.

Final Office Action mailed Jan. 3, 2013, for U.S. Appl. No. 11/818,498, filed Jun. 13, 2007, 17 pages.

Final Office Action mailed Feb. 5, 2013, for U.S. Appl. No. 12/500,911, filed Jul. 10, 2009, 15 pages.

Final Office Action mailed Apr. 30, 2013, for U.S. Appl. No. 12/494,173, filed Jun. 29, 2009, 7 pages.

Final Office Action mailed May 22, 2013, for U.S. Appl. No. 12/206,680, filed Sep. 8, 2008, 16 pages.

Great Britain Search Report mailed Jan. 19, 2009, for GB Application No. GB0817242.1, filed Sep. 22, 2008, two pages.

Great Britain Search Report mailed Jan. 19, 2010, for GB Application No. GB0817242.1, filed Sep. 22, 2008, two pages.

International Search Report mailed on Mar. 19, 2009, for PCT Application No. PCT/US2008/078836, filed on Oct. 3, 2008, four pages.

International Search Report mailed Jul. 17, 2009, for PCT Application No. PCT/US2009/041460, three pages.

International Search Report mailed Aug. 5, 2009, for PCT Application No. PCT/US2009/041465, filed Apr. 22, 2009, four pages.

International Search Report mailed Jan. 14, 2011, for PCT Application No. PCT/US2010/029698, filed Apr. 1, 2010, 4 pages.

Non-Final Office Action mailed Feb. 4, 2011, for U.S. Appl. No. 12/038,760, filed Feb. 27, 2008, 18 pages.

Non-Final Office Action mailed Jun. 9, 2011, for U.S. Appl. No. 12/206,680, filed Sep. 8, 2008, 13 pages.

Non-Final Office Action mailed Jul. 8, 2011, for U.S. Appl. No. 12/110,075, filed Apr. 25, 2008, 14 pages.

Non-Final Office Action mailed Jul. 11, 2011, for U.S. Appl. No. 12/110,024, filed Apr. 25, 2008, 12 pages.

Non-Final Office Action mailed Aug. 17, 2011, for U.S. Appl. No. 12/333,250, filed Dec. 11, 2008, 12 pages.

Non-Final Office Action mailed Jan. 25, 2012, for U.S. Appl. No. 12/110,075, filed Apr. 25, 2008, 21 pages.

Non-Final Office Action mailed May 25, 2012, for U.S. Appl. No. 11/818,498, filed Jun. 13, 2007, 16 pages.

Non-Final Office Action mailed Jun. 7, 2012, for U.S. Appl. No. 12/500,911, filed Jul. 10, 2009, 16 pages.

Non-Final Office Action mailed Jul. 3, 2012, for U.S. Appl. No. 12/110,024, filed Apr. 25, 2008, 19 pages.

Non-Final Office Action mailed Sep. 26, 2012, for U.S. Appl. No. 12/206,680, filed Sep. 8, 2008, 14 pages.

Non-Final Office Action mailed Nov. 28, 2012, for U.S. Appl. No. 12/494,173, filed Jun. 29, 2009, six pages.

Non-Final Office Action mailed Jan. 2, 2013, for U.S. Appl. No. 12/038,760, filed Feb. 27, 2008, 20 pages.

Non-Final Office Action mailed Mar. 28, 2013, for U.S. Appl. No. 12/110,075, filed Apr. 25, 2008, 14 pages.

Non-Final Office Action mailed Mar. 29, 2013 for U.S. Appl. No. 13/737,779, filed Jan. 9, 2013, nine pages.

Non-Final Office Action mailed Sep. 30, 2013, for U.S. Appl. No. 12/206,680, filed Sep. 8, 2008, 18 pages.

Notice of Allowance mailed Aug. 28, 2012, for U.S. Appl. No. 12/333,250, filed Dec. 11, 2008, nine pages.

Notice of Allowance mailed May 23, 2013, for U.S. Appl. No. 12/110,024, filed Apr. 25, 2008, five pages.

Notice of Allowance mailed Aug. 19, 2013, for U.S. Appl. No. 12/500,911, filed Jul. 10, 2009, six pages.

Notice of Allowance mailed Sep. 3, 2013, for U.S. Appl. No. 13/737,779, filed Jan. 9, 2013, 10 pages.

Search Report mailed Apr. 29, 2009, for NL Application No. 2001672, with English translation of Written Opinion, eight pages.

Final Office Action mailed Feb. 1, 2013, for U.S. Appl. No. 12/642,466, filed Dec. 18, 2009, nine pages.

Final Office Action mailed Jan. 27, 2014, for U.S. Appl. No. 12/206,680, filed Sep. 8, 2008, 20 pages.

Final Office Action mailed Apr. 23, 2014 for U.S. Appl. No. 12/847,987, filed Jul. 30, 2010, 16 pages.

International Search Report mailed May 2, 2011, for PCT Application No. PCT/US2010/058988, filed Dec. 3, 2010, five pages.

Non-Final Office Action mailed Aug. 28, 2012, for U.S. Appl. No. 12/642,466, filed Dec. 18, 2009, nine pages.

Non-Final Office Action mailed Nov. 8, 2013, for U.S. Appl. No. 12/642,466, filed Dec. 18, 2009, 12 pages.

Non-Final Office Action mailed Apr. 10, 2014, for U.S. Appl. No. 14/055,717, filed Oct. 16, 2013, 10 pages.

* cited by examiner

ID_REGIONS IN DIAMOND CONFIGURATION

CROSS REFERENCE TO RELATED APPLICATIONS

This application claims benefit of U.S. Provisional Application No. 61/149,270, filed Feb. 2, 2009, the contents of which are incorporated herein by reference in their entirety for all purposes.

FIELD

This relates to touch sensitive devices having touch regions formed in a particular configuration and, more particularly, to touch sensitive device having touch regions formed in a diamond configuration.

BACKGROUND

Many types of input devices are available for performing operations in a computing system, such as buttons or keys, mice, trackballs, touch sensor panels, joysticks, touch pads, touch screens, and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned behind the panel so that the touch sensitive surface can substantially cover the viewable area of the display device. Touch screens can generally allow a user to perform various functions by touching or near touching the touch sensor panel using one or more fingers, a stylus or other object at a location dictated by a user interface (UI) including virtual buttons, keys, bars, displays, and other elements, being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch screens that integrate touch circuitry with display circuitry are described in U.S. patent application Ser. No. 11/760,080, entitled "Touch Screen Liquid Crystal Display," and Ser. No. 12/240,964, entitled "Display with Dual-Function Capacitive Elements," the contents of which are incorporated herein by reference in their entirety for all purposes. In these touch screens, display pixels can be grouped into drive regions to receive a stimulation signal and sense regions to transmit a touch signal based on a touch or near touch. These regions can generally be disposed in a rectangular configuration with, from left to right, some drive regions aligning vertically, a sense region extending vertically along the lengths of the drive regions, more drive regions aligning vertically, another sense region extending vertically along the lengths of the drive regions, and so on.

Because of this rectangular configuration, horizontal drive lines for transmitting the stimulation signal and vertical sense lines for transmitting the touch signal can cross numerous times in the sense regions, creating parasitic capacitance that can interfere with the ability of the touch screen to effectively sense the touch or near touch. However, to reduce the effects of this parasitic capacitance, more expensive and powerful sensing circuitry may be needed to improve the signal-to-noise ratio of the touch signal.

SUMMARY

This relates to a touch sensitive device having touch regions formed in a diamond configuration. Touch regions can include drive regions, which can have drive lines to receive a stimulation signal, and sense regions, which can have sense lines to transmit a touch signal based on a received touch or near touch. The drive regions and the sense regions can include display pixels having capacitive elements for sensing touch. The drive regions and sense regions can be disposed diagonally adjacent to each other to form a diamond configuration for sensing the touch or near touch.

In some embodiments, diagonal drive regions can be separate and unconnected from each other, while diagonal sense regions can be electrically connected to each other via their sense lines. The diagonal sense regions can all be connected in the forward diagonal direction, all in the backward diagonal direction, or some in the forward diagonal direction and others in the backward diagonal direction.

In some embodiments, diagonal drive regions can be electrically connected together via their drive lines and diagonal sense regions can be electrically connected together via their sense lines. The diagonal regions can all be connected in the forward diagonal direction, all in the backward diagonal direction, drive regions in the forward diagonal direction and sense regions in the backward diagonal direction, drive regions in the backward diagonal direction and sense regions in the forward diagonal direction, and any combination thereof.

The diamond configuration can advantageously reduce the parasitic capacitance in the touch sensitive device, e.g., by reducing the number of crossovers in the sense regions between the drive and sense lines. This can result in cost and power savings for the touch sensitive device.

DETAILED DESCRIPTION

Figure 1:
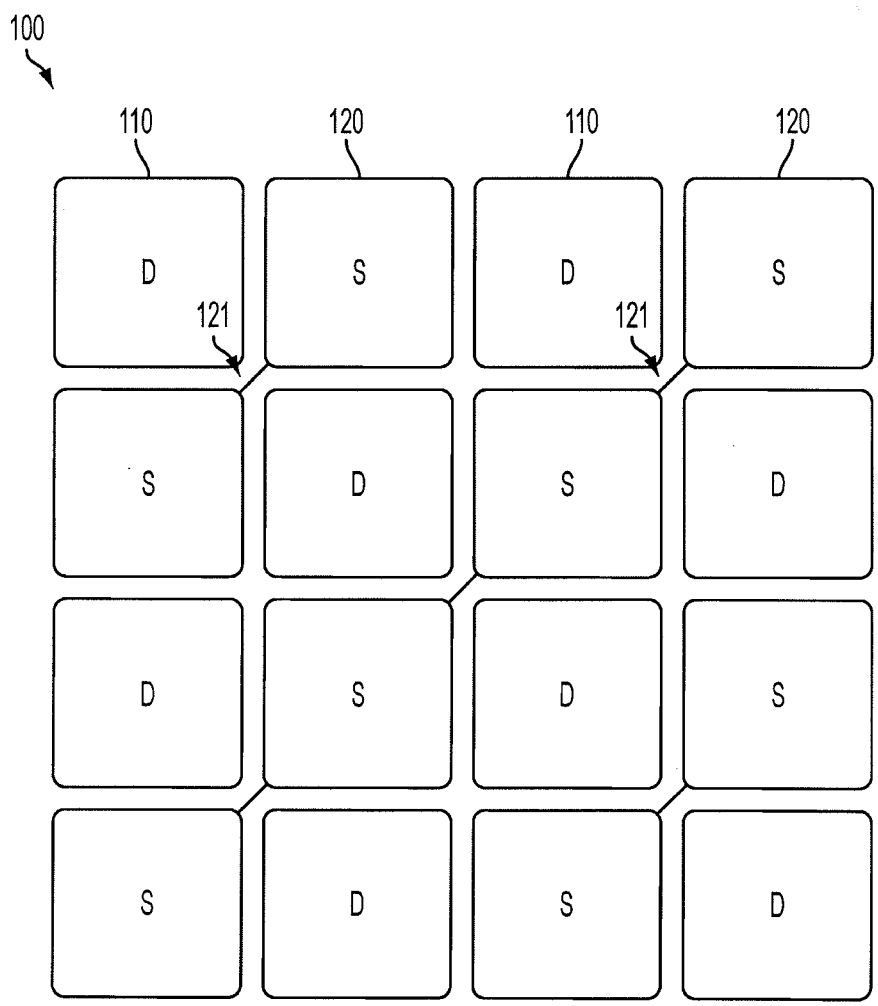
FIG. 1 illustrates an exemplary touch sensitive device having touch regions in a diamond configuration according to various embodiments.

In the following description of various embodiments, reference is made to the accompanying drawings in which it is shown by way of illustration specific embodiments which can be practiced. It is to be understood that other embodiments can be used and structural changes can be made without departing from the scope of the embodiments.

This relates to a touch sensitive device having touch regions disposed in a diamond configuration. Touch regions can include drive regions, which can receive a stimulation signal, and sense regions, which can send a touch signal based on a received touch or near touch. The drive regions and sense regions can be disposed diagonally adjacent to each other to form a diamond configuration. In some embodiments, diagonal drive regions can be separate and unconnected from each other, while diagonal sense regions can be electrically connected to each other via their sense lines. The diagonal sense regions can all be connected in the forward diagonal direction, all in the backward diagonal direction, or some in the forward diagonal direction and others in the backward diagonal direction. In some embodiments, diagonal drive regions can be electrically connected together via their drive lines and diagonal sense regions can be electrically connected together via their sense lines. The diagonal regions can all be connected in the forward diagonal direction, all in the backward diagonal direction, drive regions in the forward diagonal direction and sense regions in the backward diagonal direction, drive regions in the backward diagonal direction and sense regions in the forward diagonal direction, and any combination thereof. The diamond configuration can advantageously reduce the parasitic capacitance in the touch sensitive device by reducing the number of crossovers in the sense regions between the drive and sense lines, which can result in cost and power savings for the touch sensitive device.

A "diamond" configuration can refer to any configuration in which the drive and sense regions are disposed in slant, tilt, angle, oblique, diagonal, or otherwise mainly non-horizontal or non-vertical patterns. Among several regions, a group of the drive regions together, a group of the sense regions together, or a combination of drive and sense regions together so disposed can resemble a diamond shape.

The terms "drive line," "horizontal common voltage line," and "xVcom" can refer generally to the conductive lines of the LCD used to transmit a stimulation signal. In most cases, though not always, the term "drive line" can be used when referring to these conductive lines in the drive regions of the LCD because they can be used to transmit a stimulation signal to drive the drive regions.

The terms "sense line," "vertical common voltage line," and "yVcom" can refer generally to the conductive lines of the LCD used to transmit a touch signal. In most cases, though not always, the term "sense line" can be used when referring to these conductive lines in the sense regions of the LCD because they can be used to transmit a touch signal to sense the touch or near touch.

The term "subpixel" can refer to a red, green, or blue display component of the LCD, while the term "pixel" can refer to a combination of a red, a green, and a blue subpixel.

Although some embodiments may be described herein in terms of touch screens, it should be understood that embodiments are not so limited, but are generally applicable to any devices utilizing touch and other types of sensing technologies.

FIG. 1 illustrates an exemplary touch sensitive device having touch regions in a diamond configuration according to various embodiments. In the example of FIG. 1, touch sensitive device 100 can have touch regions, which can include drive (D) regions 110 and sense (S) regions 120. The drive regions 110 can be configured to receive a stimulation signal. The sense regions 120 can be configured to send a touch signal based on a touch or near touch by an object, such as a finger. The touch regions can form a matrix of rows and columns, where the drive regions 110 and the sense regions 120 can alternate in the rows and the columns. The matrix diagonals can then have either all drive regions 110 or all sense regions 120.

In this example, the drive regions 110 in a diagonal can be separate and unconnected from each other. The sense regions 120 in a backward diagonal can be electrically connected to each other via connection 121. The connections will be described in more detail later. These drive and sense region diagonals can form a diamond configuration for the touch sensitive device 100.

In operation, the touch sensitive device 100 can stimulate the drive regions 110 with stimulation signals to form electric field lines between the stimulated drive regions and adjacent sense regions 120. When an object touches or near touches a stimulated drive region 110, the object can affect some of the electric field lines extending to the adjacent sense regions 120, thereby reducing the amount of charge coupled to these adjacent sense regions 120. This reduction in charge can be sensed by the sense regions 120 as an "image" of touch. This touch image can be transmitted along the diagonal sense regions 120, which include the sense region that sensed the touch, via the connections 121 to touch circuitry for further processing. For example, if a touch or near touch happens in the upper left drive region 110, some of the electrical field lines extending to the horizontal neighboring sense region 120 can be affected. The sense region 120 can sense the reduction in charge and transmit the sensed reduction along the diagonal via its connection 121 to the next sense region, which can in turn transmit the sensed reduction to touch circuitry for further processing.

In alternate embodiments, the touch sensitive device can have the sense regions electrically connected in their respective diagonals in a forward diagonal direction. In other alternate embodiments, the touch sensitive device can have the sense regions electrically connected in their respective diagonals in a combination of forward and backward diagonal directions.

In some embodiments, one or more of the drive regions in a row can be electrically connected together via their drive lines. Optionally or alternatively, one or more of the drive regions can be electrically connected in their respective diagonals in the forward, backward, or both diagonal directions via their drive lines.

It is to be understood that the configuration of the touch regions in a touch sensitive device is not limited to that shown here, but can include any other suitable diagonal, slant, tilt, angle, oblique, and the like configurations according to various embodiments. It is further to be understood that the touch regions need not form a matrix of rows and columns as shown here, but can form any other suitable layout according to various embodiments. It is also to be understood that the touch regions are not limited to the rectangular shapes and orientations shown here, but can include any other suitable shapes and orientations according to various embodiments.

Touch regions, e.g., drive regions and sense regions, of a touch sensitive device can be formed by groups of pixels electrically connected together. A touch sensitive device can include a touch screen, a touch panel, and the like. For example, touch regions in a touch screen can be formed by groups of pixels having display and touch capabilities, in which the pixels can be used to display graphics or data and to sense a touch or near touch.

Figure 2:
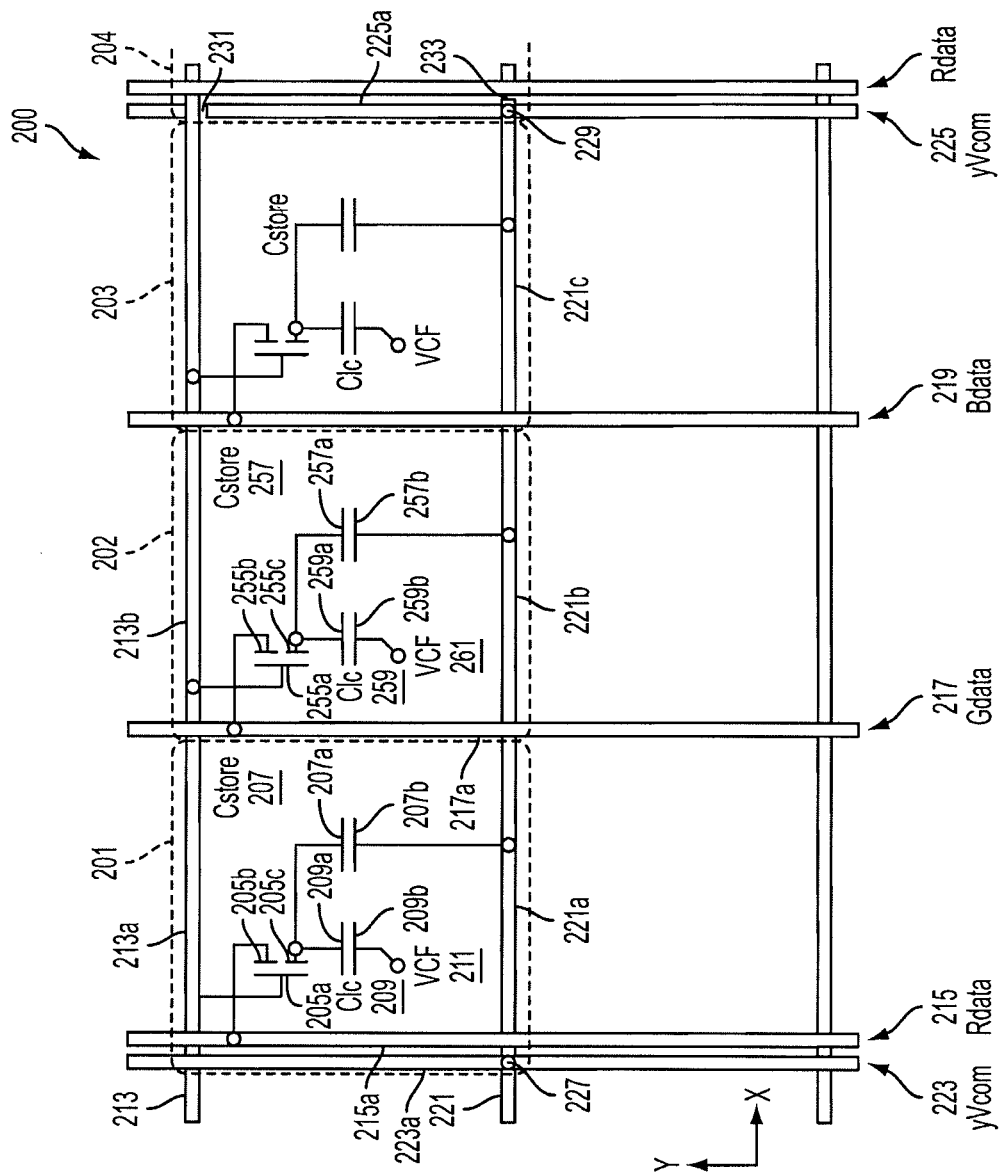
FIG. 2 illustrates a partial circuit diagram of exemplary pixels having display and touch capabilities that can be grouped to form touch regions in a diamond configuration according to various embodiments.

FIG. 2 illustrates a partial circuit diagram of exemplary pixels having display and touch capabilities that can be grouped to form touch regions according to various embodiments. In the example of FIG. 2, touch sensitive device 200, e.g., a touch screen, can include subpixels according to various embodiments. The subpixels of the device 200 can be configured such that they are capable of dual-functionality as both display subpixels and touch sensor elements. That is, the subpixels can include circuit elements, such as capacitive elements, electrodes, etc., that can operate as part of the display circuitry of the pixels, during a display mode of the device, and that can also operate as elements of touch sensing circuitry, during a touch mode of the device. In this way, the device 200 can operate as a display with integrated touch sensing capability. FIG. 2 shows details of subpixels 201, 202, 203, and 204 of device 200. Note that each of the subpixels can represent either red (R), green (G) or blue (B), with the combination of all three R, G and B subpixels forming a single color pixel.

Subpixel 202 can include thin film transistor (TFT) 255 with gate 255a, source 255b, and drain 255c. Subpixel 202 can also include storage capacitor, Cst 257, with upper electrode 257a and lower electrode 257b, liquid crystal capacitor, Clc 259, with subpixel electrode 259a and common electrode 259b, and color filter voltage source, Vcf 261. If a subpixel is an in-plane-switching (IPS) device, Vcf can be, for example, a fringe field electrode connected to a common voltage line in parallel with Cst 257. If a subpixel does not utilize IPS, Vcf 251 can be, for example, an indium-tin-oxide (ITO) layer on the color filter glass. Subpixel 202 can also include a portion 217a of a data line for green (G) color data, Gdata line 217, and portion 213b of gate line 213. Gate 255a can be connected to gate line portion 213b, and source 255b can be connected to Gdata line portion 217a. Upper electrode 257a of Cst 257 can be connected to drain 255c of TFT 255, and lower electrode 257b of Cst 257 can be connected to a portion 221b of a common voltage line that runs in the x-direction, xVcom 221. Subpixel electrode 259a of Clc 259 can be connected to drain 255c of TFT 255, and common electrode 259b of Clc 259 can connected to Vcf 251.

The circuit diagram of subpixel 203 can be identical to that of subpixel 202. However, as shown in FIG. 2, color data line 219 running through subpixel 203 can carry blue (B) color data. Subpixels 202 and 203 can be, for example, known display subpixels.

Similar to subpixels 202 and 203, subpixel 201 can include thin film transistor (TFT) 205 with gate 205a, source 205b, and drain 205c. Subpixel 201 can also include storage capacitor, Cst 207, with upper electrode 207a and lower electrode 207b, liquid crystal capacitor, Clc 209, with subpixel electrode 209a and common electrode 209b, and color filter voltage source, Vcf 211. Subpixel 201 can also include a portion 215a of a data line for red (R) color data, Rdata line 215, and a portion 213a of gate line 213. Gate 205a can be connected to gate line portion 213a, and source 205b can be connected to Rdata line portion 215a. Upper electrode 207a of Cst 207 can be connected to drain 205c of TFT 205, and lower electrode 207b of Cst 207 can be connected to a portion 221a of xVcom 221. Subpixel electrode 209a of Clc 209 can be connected to drain 205c of TFT 205, and common electrode 209b of Clc 209 can be connected to Vcf 211.

Unlike subpixels 202 and 203, subpixel 201 can also include a portion 223a of a common voltage line running in the y-direction, yVcom 223. In addition, subpixel 201 can include a connection 227 that connects portion 221a to portion 223a. Thus, connection 227 can connect xVcom 221 and yVcom 223.

Subpixel 204 (only partially shown in FIG. 2) can be similar to subpixel 201, except that a portion 225a of a yVcom 225 can have a break (open) 231, and a portion 221b of xVcom 221 can have a break 233.

As can be seen in FIG. 2, the lower electrodes of storage capacitors of subpixels 201, 202, and 203 can be connected together by xVcom 221. This can be, for example, a type of connection in known display panels and, when used in conjunction with known gate lines, data lines, and transistors, can allow subpixels to be addressed. The addition of vertical common voltage lines along with connections to the horizontal common voltage lines can allow grouping of subpixels in both the x-direction and y-direction, as described in further detail below. For example, yVcom 223 and connection 227 to xVcom 221 can allow the storage capacitors of subpixels 201, 202, and 203 to be connected to storage capacitors of subpixels that are above and below subpixels 201, 202, 203 (the subpixels above and below are not shown). For example, the subpixels immediately above subpixels 201, 202, and 203 can have the same configurations as subpixels 201, 202, and 203, respectively. In this case, the storage capacitors of the subpixels immediately above subpixels 201, 202, and 203 would be connected to the storage capacitors of subpixels 201, 202, and 203.

In general, a display can be configured such that the storage capacitors of all subpixels in the display can be connected together, for example, through at least one vertical common voltage line with connections to horizontal common voltage lines. Another display can be configured such that different groups of subpixels can be connected together to form separate regions of connected-together storage capacitors.

One way to create separate regions can be by forming breaks (opens) in the horizontal and/or vertical common lines. For example, yVcom 225 of device 200 can have break 231, which can allow subpixels above the break to be isolated from subpixels below the break. Likewise, xVcom 221 can have break 233, which can allow subpixels to the right of the break to be isolated from subpixels to the left of the break.

A drive region can be formed by connecting at least one vertical common voltage line yVcom 223, 225 of a pixel with at least one horizontal common voltage line xVcom 221 of the pixel, thereby forming a drive region including a row of pixels. A drive plate (e.g., an ITO plate) can be used to cover the drive region and connect to the vertical and horizontal common voltage lines so as to group the capacitive elements of the pixels together to form the drive region for touch mode. Generally, a drive region can be larger than a single row of pixels in order to effectively receive a touch or near touch on the touch sensitive device. For example, a drive region can be formed by connecting vertical common voltage lines yVcom with horizontal common voltage lines xVcom, thereby forming a drive region including a matrix of pixels. In some embodiments, drive regions proximate to each other can share horizontal common voltage lines xVcom as drive lines, which can transmit stimulation signals that stimulate the drive regions, as previously described. In some embodiments, drive regions proximate to each other can share vertical common voltage lines yVcom with breaks in the lines between the drive regions in order to minimize the lines causing parasitic capacitance that could interfere with the received touch or near touch. Optionally and alternatively, the vertical common voltage line breaks can be omitted and the lines shared in their entirety among the drive regions.

A sense region can be formed by at least one vertical common voltage line yVcom 223, 225 of a pixel, thereby forming a sense region including a column of pixels. A sense plate (e.g., an ITO plate) can be used to cover the sense region and connect to the vertical common voltage line without connecting to a cross-under horizontal common voltage line so as to group the capacitive elements of the pixels together to form the sense region for touch mode. Generally, a sense region can be larger than a single column of pixels in order to effectively sense a received touch or near touch on the touch sensitive device. For example, a sense region can be formed by vertical common voltage lines yVcom, thereby forming a sense region including columns of pixels. In some embodiments, a sense region can use the vertical common voltage lines yVcom as sense lines, which can transmit a touch signal based on a touch or near touch on the touch sensitive device. In the sense region, the vertical common voltage lines yVcom can be unconnected from and cross over the horizontal common voltage lines xVcom to form a mutual capacitance structure for touch sensing. This cross over of yVcom and xVcom can also form additional parasitic capacitance between the sense and drive ITO regions that can be minimized.

It is to be understood that the pixels used to form the touch regions are not limited to those described above, but can be any suitable pixels having touch capabilities according to various embodiments. It is to be further understood that the combinations of the pixels in the touch regions are not limited to those described above, but can include any suitable combinations according to various embodiments.

Figure 3:
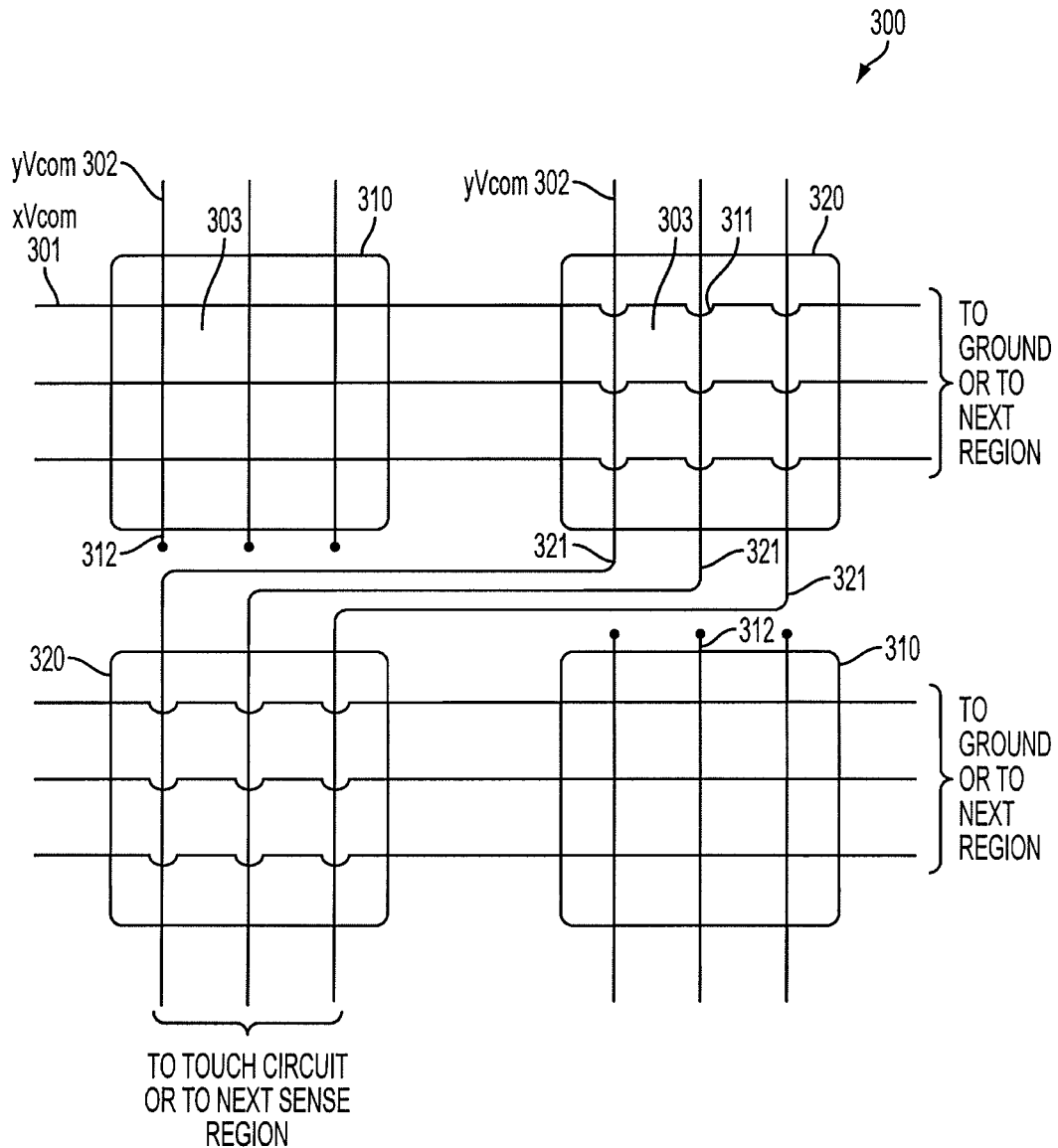
FIG. 3 illustrates an exemplary layout of connections between a touch sensitive device's touch regions in a diamond configuration according to various embodiments.

FIG. 3 illustrates an exemplary layout of connections between a touch sensitive device's touch regions in a diamond configuration according to various embodiments. In the example of FIG. 3, touch sensitive device 300 can have touch regions, which can include drive regions 310 and sense regions 320. Each drive region 310 can have pixels 303, horizontal common voltage lines xVcom 301, and vertical common voltage lines yVcom 302, covered by a drive plate. For simplicity, each pixel 303 is shown as a single block, which can represent a set of red, green, and blue subpixels. The horizontal common voltage lines 301 can connect drive regions 310 in the same row. The vertical common voltage lines 302 can have breaks 312 between adjacent regions 310, 320 in the same column. In the example of FIG. 3, in the left column, the drive region 310 illustrated above the sense region 320 can include vertical common voltage lines 302 that can have breaks just below the drive region and do not extend to the sense region. In the right column, the drive region 310 illustrated below the sense region 320 can include vertical common voltage lines 302 that can have breaks just above the drive region and do not extend to the sense region. Each sense region 320 can have pixels 303 and vertical common voltage lines 302, covered by a sense plate. The vertical common voltage lines 302 can connect (via connection 321) sense regions 320 in the same diagonal, as will be described below. The horizontal common voltage lines 301 can cross underneath 311 the sense region 320 without electrically connecting to the region.

The drive regions 310 and the sense regions 320 can lie in diagonals to form a diamond configuration. The drive regions 310 in their diagonals can be separate and unconnected from each other, while the drive regions in a row can be electrically connected to each other via the horizontal common voltage lines 301 as drive lines. The sense regions 320 in their diagonals can be electrically connected to each other via connection 321. The connection 321 can be made with the vertical common voltage lines 302 that form the sense regions 320, where the lines can pass through one sense region, veer diagonally in a backward direction to another sense region, pass through that sense region, and so on either to the next sense region or to touch circuitry.

By the sense regions 320 being disposed in the diamond configuration, some of the horizontal common voltage lines 301 can either cross under the connection 321 outside of the sense regions 320 or be eliminated entirely, thereby reducing the parasitic capacitance effects caused by the crossings and/or the sense plate, e.g., an ITO plate, within the sense regions themselves. As a result, more expensive and powerful sensing circuitry need not be used to, in part, address these parasitic capacitance effects in order to effectively sense a touch or near touch. These improved effects can similarly be realized in any of the diamond configurations described below.

In operation, the horizontal common voltage lines 301 can stimulate the drive regions 310 with stimulation signals to form electric field lines between the stimulated drive regions and adjacent sense regions 320. When an object touches or near touches a stimulated drive region 310, the reduction in charge in the adjacent sense region 320 can be sensed and a corresponding signal transmitted along the vertical common voltage lines 302 of that sense region and subsequent sense regions diagonally electrically connected in the backward diagonal direction to the touch circuitry for further processing.

The connection 321 in FIG. 3 has a separate line for each vertical common voltage line 302. Alternatively, the connection 321 can tie all of the vertical common voltage lines 302 in a particular sense region 320 together and have a single line between sense regions.

In alternate embodiments, the vertical common voltage lines 302 in the sense regions 320 can form a connection between diagonal sense regions in the forward diagonal direction. In other alternate embodiments, the vertical common voltage lines 302 in the drive regions 310 can form a connection between diagonal drive regions in either the forward or the backward diagonal direction.

It is to be understood that the layout of the connections is not limited to that shown, but can include any suitable layout, e.g., any number and configuration of horizontal and vertical common voltage lines, pixels, touch regions, and so on, according to various embodiments.

Figure 4:
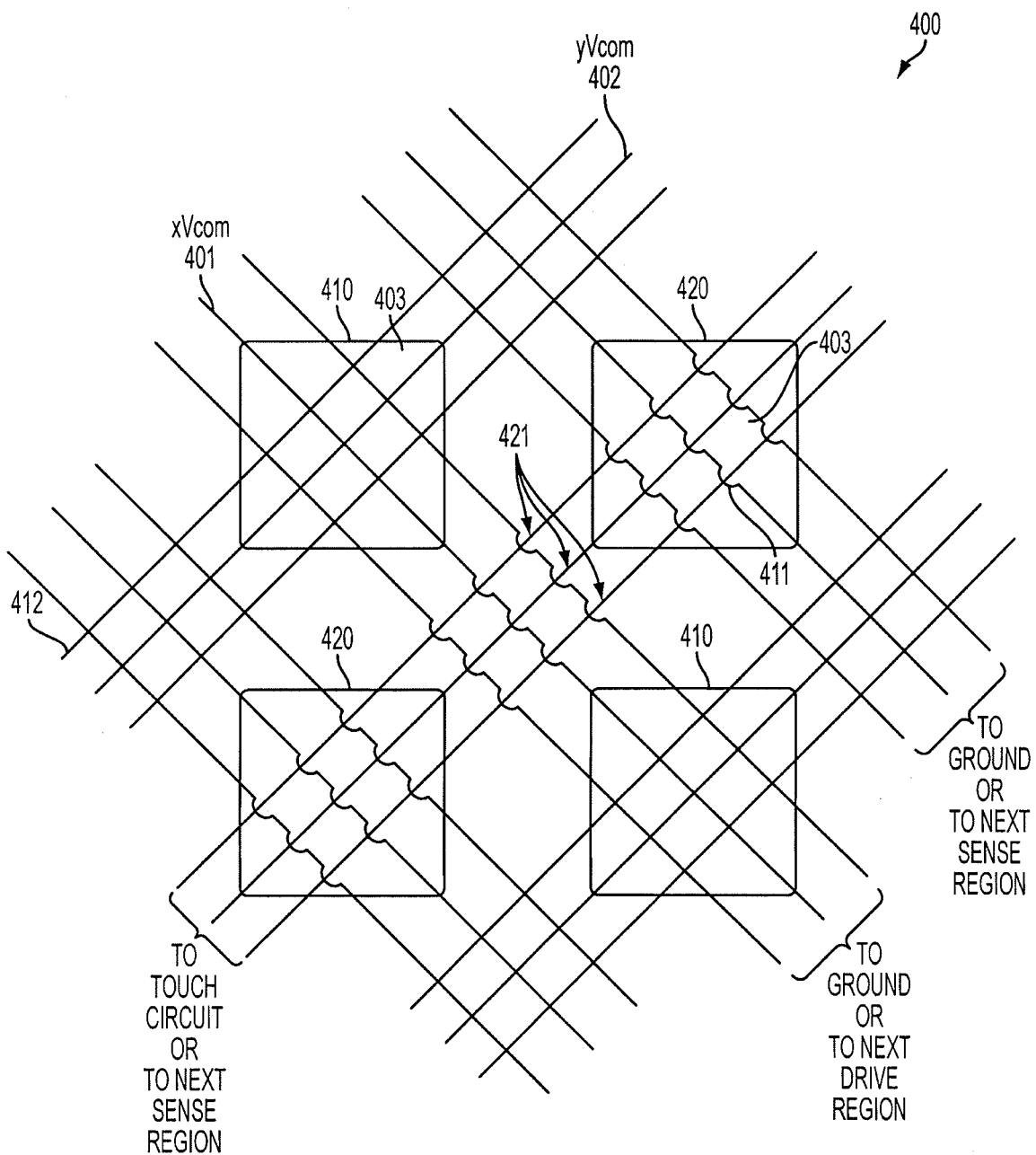
FIG. 4 illustrates another exemplary layout of connections between a touch sensitive device's touch regions in a diamond configuration according to various embodiments.

FIG. 4 illustrates another exemplary layout of connections between a touch sensitive device's touch regions in a diamond configuration according to various embodiments. In the example of FIG. 4, touch sensitive device 400 can have touch regions, which can include drive regions 410 and sense regions 420, each having pixels 403. The four boundaries of a pixel 403 can be formed by adjacent forward diagonal common voltage lines 401 and adjacent backward diagonal common voltage lines 402. Each drive region 410 can have pixels 403, forward diagonal common voltage lines xVcom 401, and backward diagonal common voltage lines yVcom 402. The forward diagonal common voltage lines 401 can connect drive regions 410 in the same forward diagonal. The backward diagonal common voltage lines 402 can have breaks 412 between drive regions in the same backward diagonal. Each sense region 420 can have pixels 403 and backward diagonal common voltage lines 402. The backward diagonal common voltage lines 402 can connect sense regions 420 in the same backward diagonal, as will be described below. The forward diagonal common voltage lines 401 can cross underneath 411 the sense region 420 without electrically connecting to the region.

The drive regions 410 and the sense regions 420 can lie in diagonals to form a diamond configuration. The drive regions 410 in their forward diagonals can be electrically connected to each other via the forward diagonal common voltage lines 401 as drive lines, while the drive regions in a row can be separate and unconnected from each other. The sense regions 420 in their diagonals can be electrically connected to each other via connection 421. The connection 421 can be made with the backward diagonal common voltage lines 402 that form the sense regions 420, where the lines can pass through each sense region in the backward diagonal to the touch circuitry.

In operation, the forward diagonal common voltage lines 401 can stimulate the drive regions 410 with stimulation signals to form electric field lines between the stimulated drive regions and adjacent sense regions 420. When an object touches or near touches a stimulated drive region 410, the reduction in charge in the adjacent sense region 420 can be sensed and a corresponding signal transmitted along the backward diagonal common voltage lines 402 of that sense region and subsequent sense regions diagonally electrically connected in the backward diagonal direction to the touch circuitry for further processing.

In alternate embodiments, the backward diagonal common voltage lines 402 in the sense regions 420 can form a connection between diagonal sense regions in the forward diagonal direction. In other alternate embodiments, the backward diagonal common voltage lines 402 in the drive regions 410 can form a connection between diagonal drive regions in either the forward or the backward diagonal direction. In further alternate embodiments, the forward diagonal common voltage lines 401 in the sense regions 420 that do not connect to a drive region 410 at all can be omitted.

It is to be understood that the layout of the connections is not limited to that shown, but can include any suitable layout, e.g., any number and configuration of horizontal and vertical common voltage lines, pixels, touch regions, and so on, according to various embodiments.

Figure 5:
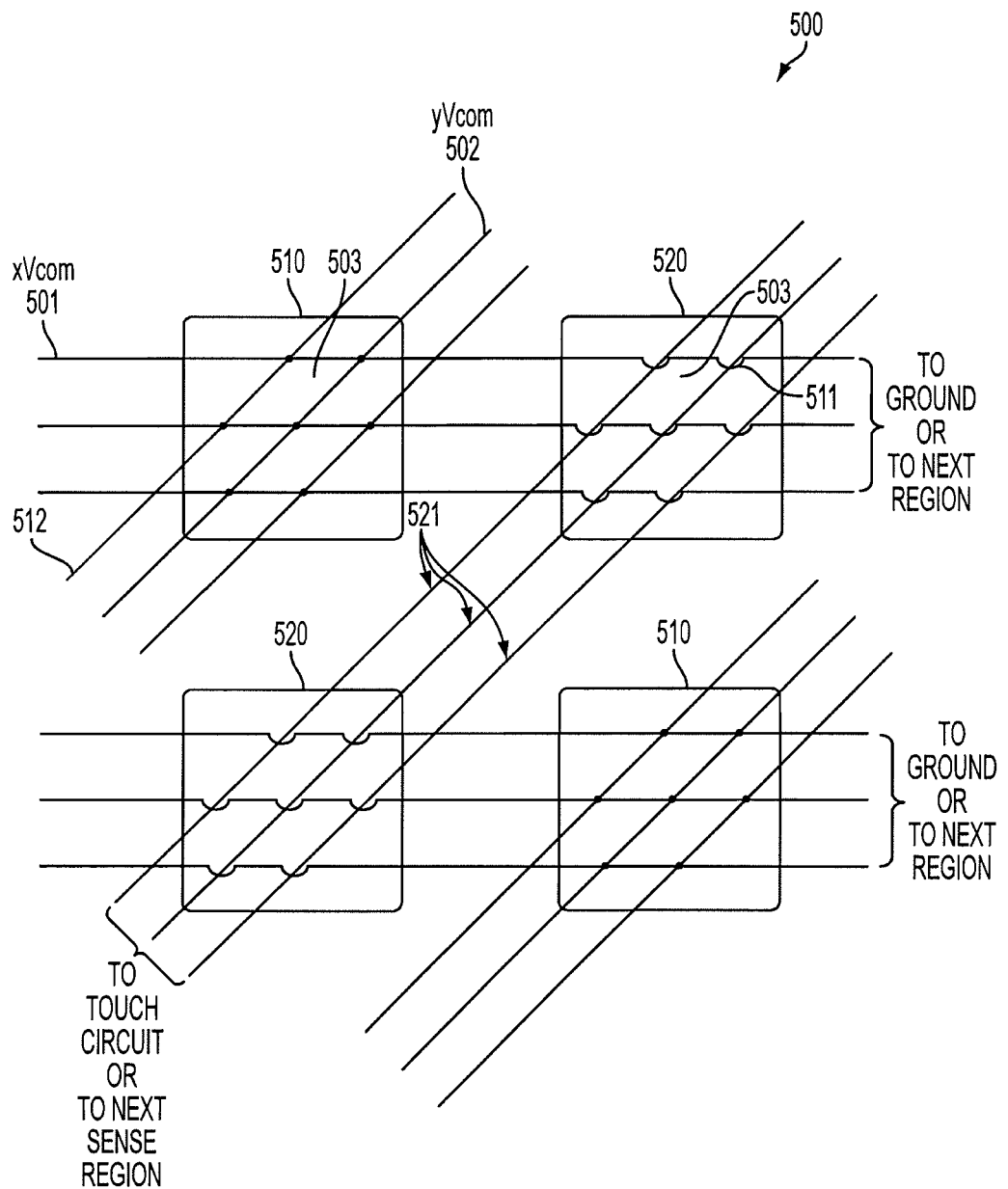
FIG. 5 illustrates still another exemplary layout of connections between a touch sensitive device's touch regions in a diamond configuration according to various embodiments.

FIG. 5 illustrates another exemplary layout of connections between a touch sensitive device's touch regions in a diamond configuration according to various embodiments. In the example of FIG. 5, touch sensitive device 500 can have touch regions, which can include drive regions 510 and sense regions 520, each including pixels 503. The top and bottom boundaries of a pixel 503 can be formed by adjacent horizontal common voltage lines 501 and the left and right boundaries of the pixel can be formed by adjacent backward diagonal common voltage lines 502. Each drive region 510 can have pixels 503, horizontal common voltage lines xVcom 501, and backward diagonal common voltage lines yVcom 502. The horizontal common voltage lines 501 can connect drive regions 510 in the same row. The backward diagonal common voltage lines 502 can have breaks 512 between drive regions in the same diagonal. Each sense region 520 can have pixels 503 and backward diagonal common voltage lines 502. The backward diagonal common voltage lines 502 can connect sense regions 520 in the same diagonal, as will be described below. The horizontal common voltage lines 501 can cross underneath 511 the sense region 520 without electrically connecting to the region.

The drive regions 510 and the sense regions 520 can lie in diagonals to form a diamond configuration. The drive regions 510 in their diagonals can be separate and unconnected from each other, while the drive regions in a row can be electrically connected to each other via the horizontal common voltage lines 501 as drive lines. The sense regions 520 in their diagonals can be electrically connected to each other via connection 521. The connection 521 can be made with the backward diagonal common voltage lines 502 that form the sense regions 520, where the lines can pass through the sense regions in the diagonal to touch circuitry.

In operation, the horizontal common voltage lines 501 can stimulate the drive regions 510 with stimulation signals to form electric field lines between the stimulated drive regions and adjacent sense regions 520. When an object touches or near touches a stimulated drive region 510, the adjacent sense region 520 can sense the touch or near touch and transmit a corresponding signal along the backward diagonal common voltage lines 502 of that sense region and subsequent sense regions diagonally electrically connected in the backward diagonal direction to the touch circuitry for further processing.

In alternate embodiments, the backward diagonal common voltage lines 502 in the sense regions 520 can form a connection between diagonal sense regions in the forward diagonal direction. In other alternate embodiments, the backward diagonal common voltage lines 502 in the drive regions 510 can form a connection between diagonal drive regions in either the forward or the backward diagonal direction. In further alternate embodiments, the horizontal common voltage lines 501 can be in a forward or backward diagonal direction and the backward diagonal common voltage lines 502 in a vertical direction.

It is to be understood that the layout of the connections is not limited to that shown, but can include any suitable layout, e.g., any number and configuration of horizontal and vertical common voltage lines, pixels, touch regions, and so on, according to various embodiments.

Figure 6:
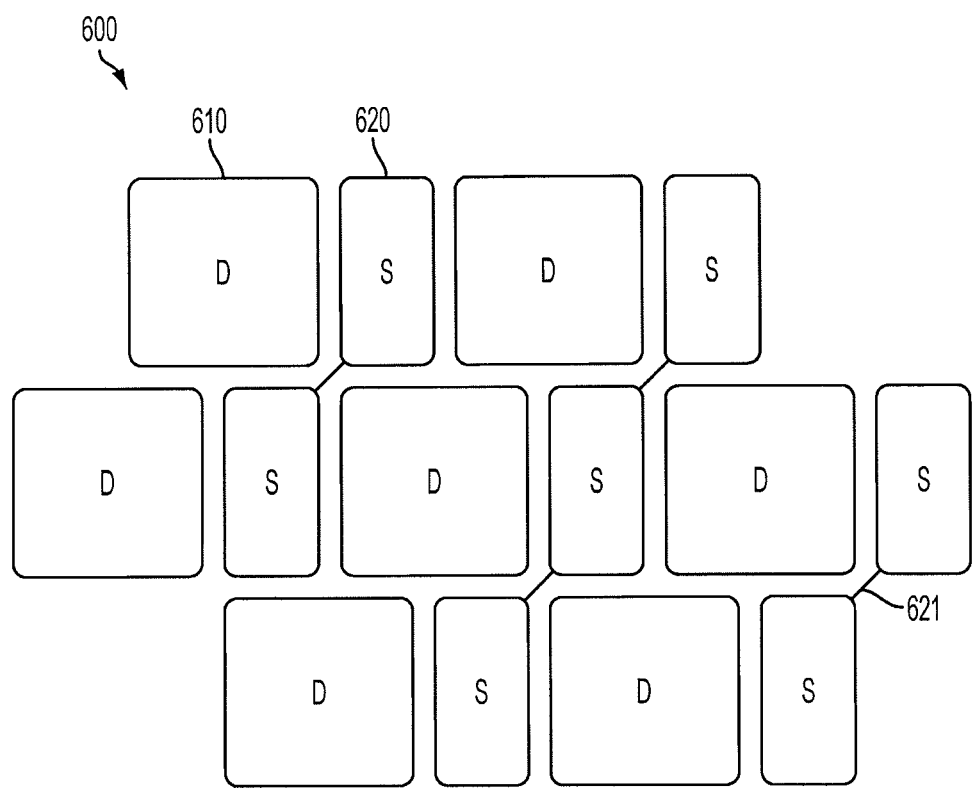
FIG. 6 illustrates another exemplary touch sensitive device having touch regions in a diamond configuration according to various embodiments.

FIG. 6 illustrates another exemplary touch sensitive device having touch regions in a diamond configuration according to various embodiments. In the example of FIG. 6, touch sensitive device 600 can have touch regions, which can include drive (D) regions 610 and sense (S) regions 620. The drive regions 610 in a diagonal can be separate and unconnected from each other. The sense regions 620 in a backward diagonal can be electrically connected to each other via connection 621. The connections can be similar to those previously describe in FIGS. 3-5. These drive and sense region diagonals can form a diamond configuration for the touch sensitive device 600. Unlike the example of FIG. 1, the drive regions 610 and the sense regions 620 can be substantially different in size. For example, the sense regions 620 can be narrower than the drive regions 610. The touch sensitive device 600 can operate in a similar manner to that described in FIG. 1.

In alternate embodiments, the touch sensitive device can have the sense regions electrically connected in their respective diagonals in a forward diagonal direction. In other alternate embodiments, the touch sensitive device can have the sense regions electrically connected in their respective diagonals in a combination of forward and backward diagonal directions.

In some embodiments, one or more of the drive regions in a row can be electrically connected together via their drive lines. Optionally or alternatively, one or more of the drive regions can be electrically connected in their respective diagonals in the forward, backward, or both diagonal directions via their drive lines.

It is to be understood that the configuration of the touch regions in a touch sensitive device is not limited to that shown here, but can include any other suitable diagonal, slant, oblique, and the like configurations according to various embodiments. It is further to be understood that the touch regions need not form a matrix of rows and columns as shown here, but can form any other suitable layout according to various embodiments. It is also to be understood that the touch regions are not limited to the rectangular shapes and orientations shown here, but can include any other suitable shapes and orientations according to various embodiments.

Figure 7:
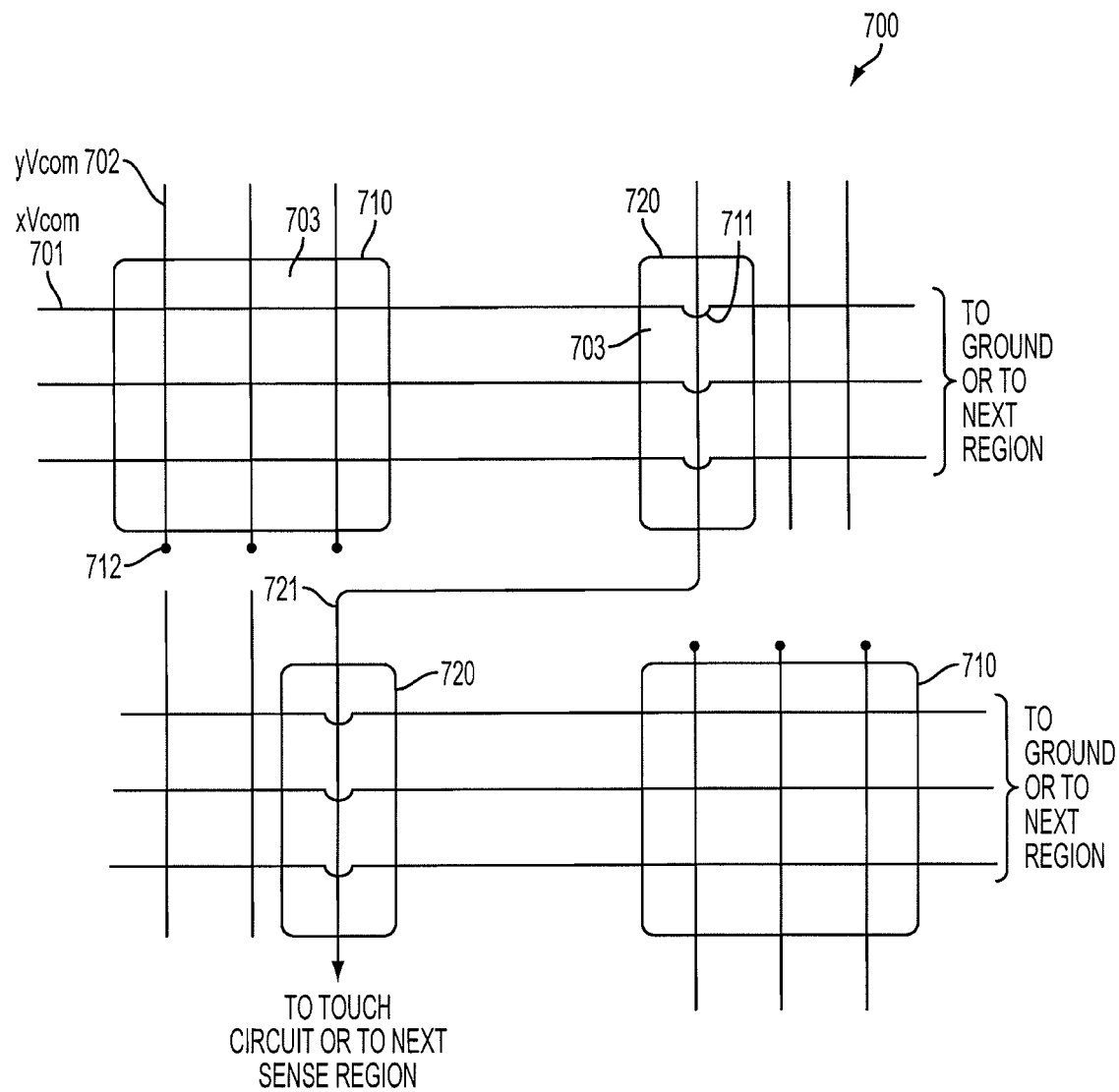
FIG. 7 illustrates an exemplary layout of connections between a touch sensitive device's touch regions in a diamond configuration according to various embodiments.

FIG. 7 illustrates an exemplary layout of connections between a touch sensitive device's touch regions in a diamond configuration according to various embodiments. In the example of FIG. 7, similar to that of FIG. 3, touch sensitive device 700 can have touch regions, which can include drive regions 710 and sense regions 720. Each drive region 710 can have pixels 703, horizontal common voltage lines xVcom 701, and vertical common voltage lines yVcom 702. The horizontal common voltage lines 701 can connect drive regions 710 in the same row. The vertical common voltage lines 702 can have breaks 712 between drive regions in the same column. Each sense region 720 can have pixels 703 and vertical common voltage lines 702. The vertical common voltage lines 702 can connect sense regions 720 in the same diagonal, as will be described below. The horizontal common voltage lines 701 can cross underneath 711 the sense region 720 without electrically connecting to the region.

The drive regions 710 and the sense regions 720 can lie in diagonals to form a diamond configuration. The drive regions 710 in their diagonals can be separate and unconnected from each other, while the drive regions in a row can be electrically connected to each other via the horizontal common voltage lines 701 as drive lines. The sense regions 720 in their diagonals can be electrically connected to each other via connection 721. The connection 721 can be made with the vertical common voltage lines 702 that form the sense regions 720, where the lines can pass through one sense region, veer diagonally in a backward direction to another sense region, pass through that sense region, and so on either to the next sense region or to touch circuitry.

In operation, the horizontal common voltage lines 701 can stimulate the drive regions 710 with stimulation signals to form electric field lines between the stimulated drive regions and adjacent sense regions 720. When an object touches or near touches a stimulated drive region 710, the reduction in charge in the adjacent sense region 720 can be sensed and a corresponding signal transmitted along the vertical common voltage lines 702 of that sense region and subsequent sense regions diagonally electrically connected in the backward diagonal direction to the touch circuitry for further processing.

The connection 721 in FIG. 7 can have a separate line for each vertical common voltage line 702 in the sense region 720 or can have a single line for all the vertical common voltage lines tied together in the sense region.

In alternate embodiments, the vertical common voltage lines 702 in the sense regions 720 can form a connection between diagonal sense regions in the forward diagonal direction. In other alternate embodiments, the vertical common voltage lines 702 in the drive regions 710 can form a connection between diagonal drive regions in either the forward or the backward diagonal direction.

Other layouts similar to those of FIGS. 4 and 5 can also be used.

It is to be understood that the layout of the connections is not limited to that shown, but can include any suitable layout, e.g., any number and configuration of horizontal and vertical common voltage lines, pixels, touch regions, and so on, according to various embodiments.

Figure 8:
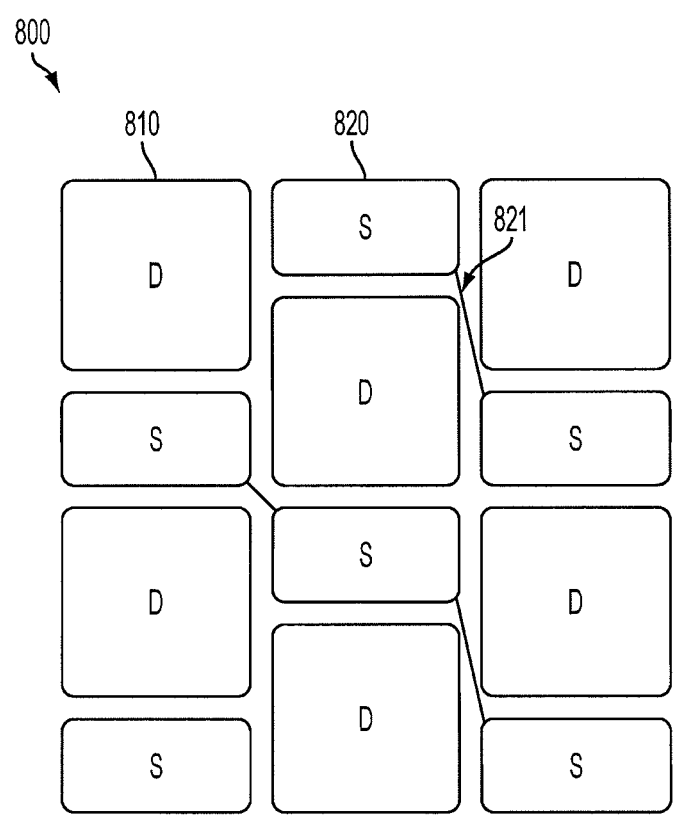
FIG. 8 illustrates another exemplary touch sensitive device having touch regions in a diamond configuration according to various embodiments.

FIG. 8 illustrates another exemplary touch sensitive device having touch regions in a diamond configuration according to various embodiments. In the example of FIG. 8, touch sensitive device 800 can have touch regions, which can include drive (D) regions 810 and sense (S) regions 820. The drive regions 810 in a diagonal can be separate and unconnected from each other. The sense regions 820 in a forward diagonal can be electrically connected to each other via connection 821. The connection 821 can involve combinations of horizontal, vertical, and diagonal common voltage lines as described in FIGS. 3-5. These drive and sense region diagonals can form a diamond configuration for the touch sensitive device 800. Like the example of FIG. 6, the drive regions 810 and the sense regions 820 can be substantially different in size. For example, the sense regions 820 can be narrower than the drive regions 810. The touch sensitive device 800 can operate in a similar manner to that described in FIG. 1.

In alternate embodiments, the touch sensitive device can have the sense regions electrically connected in their respective diagonals in a backward diagonal direction. In other alternate embodiments, the touch sensitive device can have the sense regions electrically connected in their respective diagonals in a combination of forward and backward diagonal directions.

In some embodiments, one or more of the drive regions in a row can be electrically connected together via their drive lines. Optionally or alternatively, one or more of the drive regions can be electrically connected in their respective diagonals in the forward, backward, or both diagonal directions via their drive lines.

Figure 9:
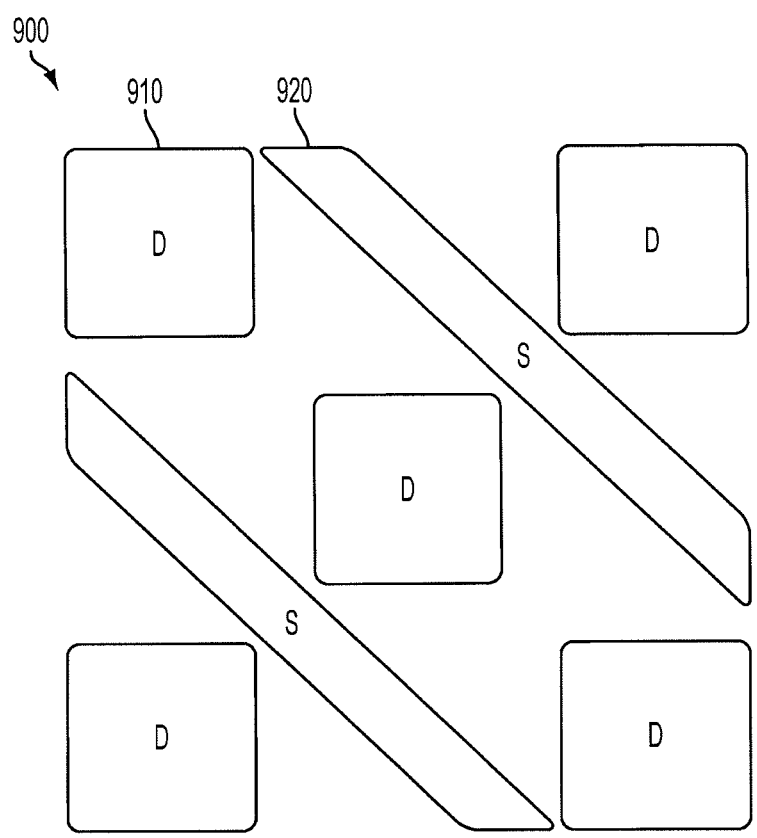
FIG. 9 illustrates still another exemplary touch sensitive device having touch regions in a diamond configuration according to various embodiments.

FIG. 9 illustrates another exemplary touch sensitive device having touch regions in a diamond configuration according to various embodiments. In the example of FIG. 9, touch sensitive device 900 can have touch regions, which can include drive (D) regions 910 and sense (S) regions 920. The drive regions 910 in a diagonal can be separate and unconnected from each other. The sense regions 920 can extend in a forward diagonal. Unlike other examples, the sense regions 920 can form single regions, rather than separate regions connected in a diagonal via connections. These drive and sense region diagonals can form a diamond configuration of the touch regions for the touch sensitive device 900. The drive regions 910 and the sense regions 920 can be substantially different in size. For example, the sense regions 920 can be narrower and longer than the drive regions 910. The touch sensitive device 900 can operate in a similar manner to that described in FIG. 1.

In alternate embodiments, the touch sensitive device can have the sense regions extend in a backward diagonal. In other alternate embodiments, the sense regions can extend in a combination of forward and backward diagonals.

In some embodiments, one or more of the drive regions in a row can be electrically connected together via their drive lines. Optionally or alternatively, one or more of the drive regions can be electrically connected in their respective diagonals in the forward, backward, or both diagonal directions via their drive lines.

Figure 10:
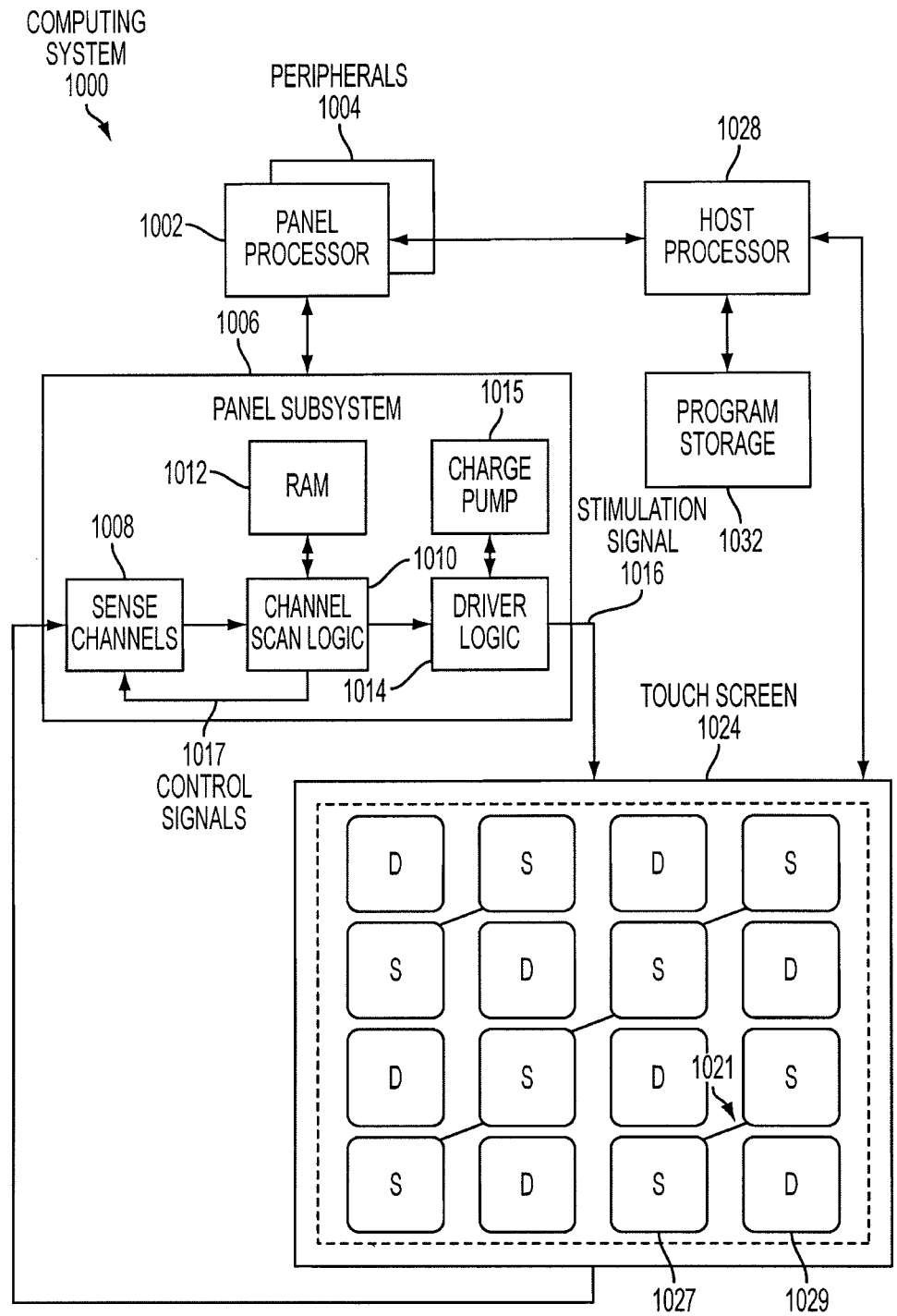
FIG. 10 illustrates an exemplary computing system having a touch screen with touch regions in a diamond configuration according to various embodiments.

FIG. 10 illustrates an exemplary computing system that can include one or more of the various embodiments described herein. In the example of FIG. 10, computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic (analog or digital) 1010 and driver logic (analog or digital) 1014. Channel scan logic 1010 can access RAM 1012, autonomously read data from sense channels 1008 and provide control signals 1017 for the sense channels. In addition, channel scan logic 1010 can control driver logic 1014 to generate stimulation signals 1016 at various phases that can be simultaneously applied to drive regions of touch screen 1024. Panel subsystem 1006 can operate at a low digital logic voltage level (e.g. 1.7 to 3.3V). Driver logic 1014 can generate a supply voltage greater that the digital logic level supply voltages by cascading two charge storage devices, e.g., capacitors, together to form charge pump 1015. Charge pump 1015 can be used to generate stimulation signals 1016 that can have amplitudes of about twice the digital logic level supply voltages (e.g. 3.4 to 6.6V). Although FIG. 10 shows charge pump 1015 separate from driver logic 1014, the charge pump can be part of the driver logic. In some embodiments, panel subsystem 1006, panel processor 1002 and peripherals 1004 can be integrated into a single application specific integrated circuit (ASIC).

Touch screen 1024 (i.e., a touch sensitive device) can include a capacitive sensing medium having drive regions 1029 and sense regions 1027 in a diamond configuration according to various embodiments. The sense regions 1027 can be electrically connected along their respective diagonals with connections 1021. Each drive region 1029 and each sense region 1027 can include capacitive elements, which can be viewed as pixels and which can be particularly useful when touch screen 1024 is viewed as capturing an "image" of touch during touch mode of the touch screen. (In other words, after panel subsystem 1006 has determined whether a touch event has been detected at each touch sensor in the touch screen, the pattern of touch sensors in the multi-touch panel at which a touch event occurred can be viewed as an "image" of touch (e.g. a pattern of fingers touching the panel).) The presence of a finger or other object near or on the touch screen can be detected by measuring changes to a signal charge present at the pixels being touched, which is a function of Csig. Each sense region 1027 of touch screen 1024 can drive sense channel 1008 in panel subsystem 1006. During display mode, the pixels can be used to display graphics or data on touch screen 1024 during display mode.

Computing system 1000 can also include host processor 1028 for receiving outputs from panel processor 1002 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and touch screen 1024 such as an LCD for providing a user interface to a user of the device.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch screen is not limited to touch, as described in FIG. 10, but may be a proximity screen or any other screen switchable between a display mode, in which the screen pixels can be used to display graphics or data, and another mode, in which the screen pixels can be used for another function, according to various embodiments. In addition, the touch screen described herein can be either a single-touch or a multi-touch screen.

Figure 11A:
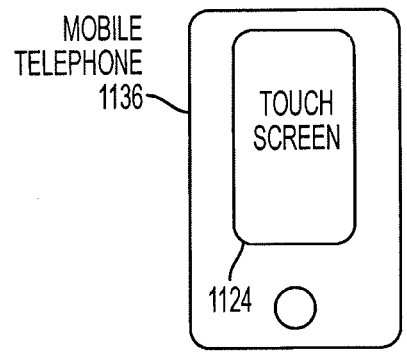
FIG. 11a illustrates an exemplary mobile telephone having a touch screen with touch regions in a diamond configuration according to various embodiments.

FIG. 11a illustrates an exemplary mobile telephone 1136 that can include touch screen 1124 having touch regions in a diamond configuration and other computing system blocks that can be utilized for the telephone.

Figure 11B:
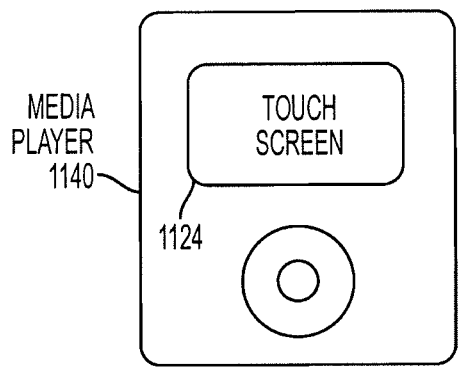
FIG. 11b illustrates an exemplary digital media player having a touch screen with touch regions in a diamond configuration according to various embodiments.

FIG. 11b illustrates an exemplary digital media player 1140 that can include touch screen 1124 having touch regions in a diamond configuration and other computing system blocks that can be utilized for the media player.

Figure 11C:
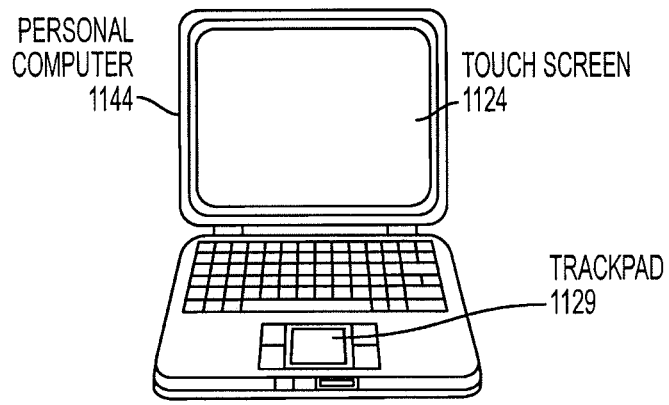
FIG. 11c illustrates an exemplary personal computer having a touch screen with touch regions in a diamond configuration according to various embodiments.

FIG. 11c illustrates an exemplary personal computer 1144 that can include touch screen 1124 having touch regions in a diamond configuration, touch sensor panel (trackpad) 1126 having touch regions in a diamond configuration, and other computing system blocks that can be utilized for the personal computer.

The mobile telephone, media player, and personal computer of FIGS. 11a, 11b and 11c can realize cost and power savings by utilizing touch screens having touch regions in a diamond configuration according to various embodiments.

Although various embodiments have been fully described with reference to the accompanying drawings, it is to be noted that various changes and modifications will become apparent to those skilled in the art. Such changes and modifications are to be understood as being included within the scope of embodiments as defined by the appended claims.

What is claimed is:

1. A touch sensitive device comprising:
a plurality of display pixels configured to display graphics or data in a display mode and to sense a touch event in a touch mode,
wherein, during the touch mode, some of the display pixels are electrically connected together by at least a first common voltage line to form drive regions for receiving a stimulation signal and others of the display pixels are electrically connected together by at least a second common voltage line to form sense regions for sending a touch signal based on the touch event, a first drive region being separated from a second drive region by a first area, and a first sense region being separated from a second sense region by a second area, and
wherein, during the touch mode, the drive regions and the sense regions are adjacently disposed in a diamond configuration, the first drive region and the second drive region are electrically connected in the diamond configuration using at least the first common voltage line within the first area, and the first sense region and the second sense region are electrically connected in the diamond configuration using at least the second common voltage line within the second area.

2. The device of claim 1, wherein each drive region comprises a plurality of drive lines formed by common voltage lines.

3. The device of claim 1, wherein each sense region comprises a plurality of sense lines formed by common voltage lines.

4. The device of claim 1, wherein the drive regions and the sense regions form a matrix of rows and columns, each row and column has alternate drive regions and sense regions, and each diagonal of the matrix has either all drive regions or all sense regions, to form the diamond configuration.

5. The device of claim 4, wherein, in each diagonal of drive regions, the drive regions are disposed in a forward diagonal direction or in a backward diagonal direction.

6. The device of claim 4, wherein, in each diagonal of sense regions, the sense regions are electrically connected together in a forward diagonal direction or in a backward diagonal direction.

7. The device of claim 1, wherein the sizes of the drive regions and the sense regions are substantially the same.

8. The device of claim 1, wherein the sizes of the drive regions and the sense regions are substantially different.

9. The device of claim 1 incorporated into at least one of a mobile telephone, a digital media player, or a personal computer.

10. A touch sensitive device comprising:
a plurality of first common voltage lines in a first plurality of display pixels and a first plurality of second common voltage lines in the first plurality of display pixels electrically connected to form a first of a plurality of first regions for driving a stimulation signal, the first of the first regions being separated from a second of the first regions by a first area; and
a second plurality of second common voltage lines in a second plurality of display pixels forming a second of a plurality of second regions for transmitting a touch signal based on a touch event, a first of the second regions being separated from the second of the second regions by a second area,
wherein, while in a touch mode configured to sense the touch event, the plurality of first and second regions are adjacently disposed in a diamond configuration, the first of the first regions and the second of the first regions are electrically connected in the diamond configuration using at least a first of the plurality of first common voltage lines within the first area, and the first of the second regions and the second of the second regions are electrically connected in the diamond configuration using at least a first of the plurality of second common voltage lines within the second area.

11. The device of claim 10, wherein the plurality of first common voltage lines are oriented either horizontally or diagonally in the plurality of first regions.

12. The device of claim 10, wherein the first plurality of second common voltage lines are oriented either vertically or diagonally in the plurality of first regions.

13. The device of claim 10, wherein the second plurality of second common voltage lines are oriented either vertically or diagonally in the plurality of second regions.

14. The device of claim 10,
wherein the first regions and the second regions form a matrix of rows and columns, each row and column has alternate first regions and second regions, and each diagonal of the matrix has either all first regions or all second regions, and
wherein, in each diagonal of first regions, the first regions are disposed in either a forward or a backward diagonal direction and, in each diagonal of second regions, the second regions are electrically connected together in either a forward or a backward diagonal direction, to form the diamond configuration.

15. A method for operating a touch sensitive device having touch regions in a diamond configuration, comprising:
receiving a touch on a touch sensitive device in a first region of display pixels electrically connected together by at least a first common voltage line, the first region disposed among a plurality of first regions in a diamond configuration, the first of the first regions being separated from a second of the first regions by a first area, the first of the first regions and the second of the first regions electrically connected in the diamond configuration using at least the first common voltage line within the first area; and
sensing the received touch in a second region of display pixels electrically connected together by at least a second common voltage line, the second region disposed among a plurality of second regions in the diamond configuration, a first of the second regions being separated from the second of the second regions by a second area, the first of the second regions and the second of the second regions electrically connected in the diamond configuration using at least the second common voltage line within the second area,
wherein
the first region that receives the touch and the second region that senses the received touch are adjacent to each other.

16. The method of claim 15, wherein receiving the touch comprises receiving a touch or near touch of an object in the first region.

17. The method of claim 15, wherein sensing the received touch comprises sensing, in the adjacent sense region, a change in capacitance by the first region.

18. A touch sensitive device comprising:
a plurality of touch regions formed during a touch mode of the device, some of the touch regions being drive regions comprising display pixels electrically connected by at least a first common voltage line and configured to drive a stimulation signal, and the other of the touch regions being sense regions comprising display pixels electrically connected by at least a second common voltage line and configured to sense a touch or near touch, a first drive region being separated from a second drive region by a first area, and a first sense region being separated from a second sense region by a second area,
wherein the drive regions and the sense regions are formed into adjacent diagonals to form a diamond configuration, the first drive region and the second drive region are electrically connected in the diamond configuration using at least the first common voltage line within the first area, and the first sense region and the second sense region are electrically connected in the diamond configuration using at least the second common voltage line within the second area.

19. The device of claim 18, wherein each diagonal of sense regions electrically connects capacitive elements of the display pixels in the sense regions together to form the diamond configuration.

20. The device of claim 18, wherein each diagonal of sense regions extends a sense region along the diagonal to form the diamond configuration.

21. The device of claim 18, wherein each diagonal of drive regions electrically connects capacitive elements of the display pixels in the drive regions together to form the diamond configuration.

22. The device of claim 18, wherein each diagonal of drive regions disposes the drive regions unconnected along the diagonal to form the diamond configuration.

23. The device of claim 18, wherein each drive region comprises:
a plurality of first common voltage lines intersecting with a plurality of second common voltage lines; and
a grouping of the intersecting lines to form the drive region.

24. The device of claim 18, wherein each sense region comprises:
a plurality of common voltage lines; and
a grouping of the lines to form the sense region.

25. A touch screen comprising:
a plurality of display pixels configured to display graphics or data in a display mode and to sense a touch event in a touch mode,
wherein, during the touch mode, some of the display pixels are electrically connected together by at least a first common voltage line to form drive regions for receiving a stimulation signal to drive the drive regions to receive the touch event, and others of the display pixels are electrically connected together by at least a second common voltage line to form sense regions for sending a touch signal based on the touch event, a first drive region being separated from a second drive region by a first area, and a first sense region being separated from a second sense region by a second area, and
wherein, during the touch mode, the drive regions and the sense regions are adjacently disposed in a diamond configuration, the first drive region and the second drive region are electrically connected in the diamond configuration using at least the first common voltage line within the first area, and the first sense region and the second sense region are electrically connected in the diamond configuration using at least the second common voltage line within the second area.

* * * * *